Jan. 3, 1967 N. A. NISSEN 3,295,592
TEMPERATURE CYCLING DEVICE FOR PRECISION FREQUENCY CRYSTALS
Filed Dec. 4, 1964

INVENTOR.
NIELS A. NISSEN

BY *Moody and Phillion*
ATTORNEYS

3,295,592
TEMPERATURE CYCLING DEVICE FOR PRECISION FREQUENCY CRYSTALS

Niels A. Nissen, Cedar Rapids, Iowa, assignor to Collins Radio Company, Cedar Rapids, Iowa, a corporation of Iowa
Filed Dec. 4, 1964, Ser. No. 416,028
7 Claims. (Cl. 165—12)

This invention relates generally to temperature controlled ovens and, more particularly, to a temperature controlled enclosure wherein the temperature may be varied over relatively wide ranges in a predetermined manner with respect to time.

In the manufacture and use of crystals certain problems exist with respect to changes of crystal characteristics with temperature. In many presently available high quality electronic equipments, crystals are enclosed in an oven so that the temperature thereof remains fairly constant, and variations of crystal characteristics with temperature is not a problem. However, ovens are costly and require a certain amount of space which, in many equipments, has become premium. Consequently, in some recent designs an effort has been made to utilize crystals without ovens for controlling temperature. Without ovens, however, the crystal temperature often will vary over a considerable range of perhaps 100 or more degrees centigrade.

One crystal characteristic that varies with temperature is the internal resistance thereof. For reasons not entirely understood, at a given temperature the crystal resistance might rise sharply. Such sharp rises in the crystal resistance are known as "activity dips" and can cause undesirable operation of the equipment using the crystal.

For example, a sudden rise in crystal resistance could cause an oscillator to cease oscillation.

Some crystals do not exhibit such activity dips over the required temperature range. Consequently, it is necessary in any batch of manufactured or grown crystals, to test each crystal individually to determine if its characteristics are within suitable tolerances with respect to such activity dips.

In the absence of temperature control, a further characteristic of crystals which must be checked is the variation of frequency with temperature.

An object of the present invention is to provide a testing means for measuring the activity dip characteristics of crystals over a wide temperature range.

A second object of the invention is to provide a testing means for measuring the frequency changes of a crystal over relatively wide temperature changes.

A third purpose of the invention is to provide a temperature controlled enclosure whose temperatures can be varied in a predetermined manner with time.

A fourth aim of the invention is the improvement of variable temperature controlled ovens, generally.

In accordance with the invention there is provided an oven enclosure comprised of two substantially similar half portions. The two half-sections are formed so that when placed together they form a box-like structure with a space in the center thereof, in which the crystal to be tested is placed. Cooling means for the oven are provided by a system of channels in the two half-sections of the oven, into which channels a cooling agent, such as liquid nitrogen, is circulated. A heating element is secured to the surface of each of the two half-sections of the oven, preferably on the outer surfaces of the two half-sections.

Sensing means for sensing the temperature of the oven are provided for each of the two half-sections, each of said sensing means being positioned around a stud or projection in the oven half-section, said stud being formed by cutting a circular groove into the half-section.

After cooling the oven by the liquid nitrogen means, control of the heating of the oven is effected by comparing the resistance of the sensor windings with a predefined and variable voltage which is proportional to the desired temperature at any point in time measured from the time that heating of the oven is initiated.

The above-mentioned, and other objects and features of the invention, will be more fully understood from the following detailed description thereof when read in conjunction with the drawings in which.

Figure 1:
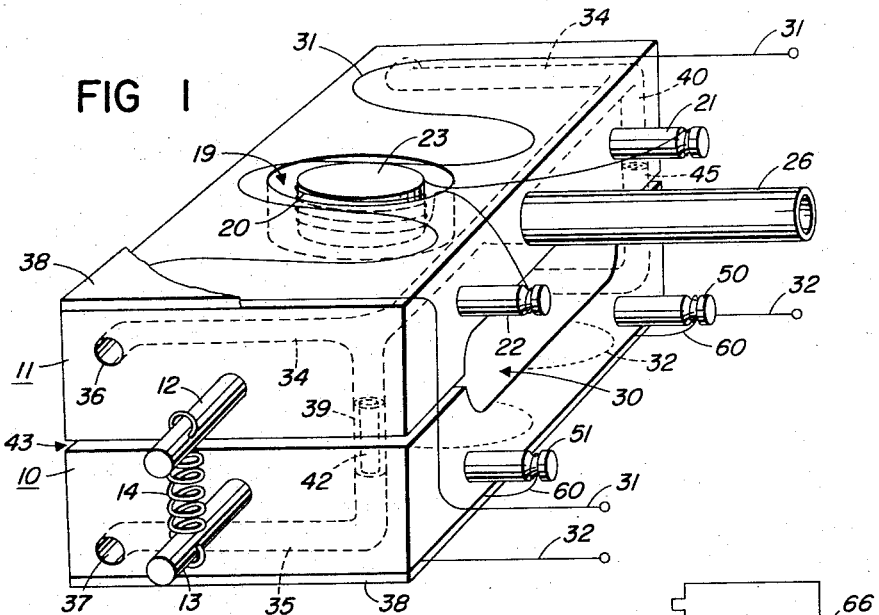
FIG. 1 is a perspective view of the oven including nitrogen cooling channels, heater windings, and sensor windings.

Referring now to FIG. 1, there is shown a perspective view of the oven. The oven is divided into two half-sections designated by reference characters 10 and 11, each of which half-section comprises a block with one side having a concavity therein so that when the two blocks 10 and 11 are placed together, as shown in FIG. 1, there is formed an opening 30 which extends into the block, and into which the crystal to be tested is placed. The test crystal ordinarily is enclosed in some suitable casing which casing actually makes contact with the two blocks 10 and 11 so as to conduct heat effectively.

The construction of the two half-section blocks 10 and 11 should be of a material which may have a low electrical conductivity but a very high thermal conductivity. The half-sections 10 and 11 are held together by some suitable means, such as a spring 14 attached to pins 12 and 13. A similar arrangement exists at the other end of the structure of FIG. 1 but is not shown specifically herein. Due to slight variation in the size of the crystals to be tested, blocks 10 and 11 do not fit snugly together but will ordinarily have a slight separation 43 therein, as indicated in FIG. 1.

In addition to half-sections 10 and 11, the oven is comprised primarily of three elements. The first of these elements are heating elements, one of which is positioned on the top of the block 11 and designated by reference character 31 and the other of which is positioned on the bottom surface of the block 10 and designated by reference character 32. Heating elements 31 and 32, preferably, are formed of some suitable heating material such as Nichrome wire. A layer of epoxy, shown in part and designated by the reference character 38, is formed over the heated Nichrome wire to assure firm contact between the Nichrome wire and the surface of block 11. The particular epoxy employed is selected to have excellent heat transfer characteristics and low electrical conductive properties. For example, an epoxy using ground or powdered aluminum has been found to be quite suitable.

The second element of the oven comprises heat or temperature sensing windings, such as the winding 20 located in the top block 11. Only the sensing element in the top block is shown, although there is a corresponding heat sensing element in the lower block 10. Such heat sensing elements are comprised of suitable material which might be copper wire. As can be seen from the drawing, the temperature sensing windings are sunk into the blocks. To prepare the blocks for placement of the temperature sensing windings therein, a circular groove 19 is first formed in the block so as to leave a cylindrically shaped center portion 23 around which the sensing winding 20 can be wound. The circular groove 19 can then be filled with an epoxy material, such as the type 20 used on the surface of the block.

The third structural element comprises the cooling system consisting of an input port 26 and a series of channels 34 and 35 formed within the blocks. Such channels 34 and 35 exist both in the top block 11 and in the lower block 10 and, as can be seen, consist of a network of channels running through both blocks. More specifically, the liquid nitrogen is fed into the input port 26 and then divides into two channels leading to both ends of top block 11. At the ends of the block 11 the channels split again with the liquid nitrogen going out along the ends of top block 11 and then out the exit ports, such as exit port 36, and also flowing down into the bottom block 10 and out the exit ports, such as exit port 37. A similar flow of nitrogen takes place at the other ends of the blocks 10 and 11.

As indicated hereinbefore, the blocks 10 and 11 ordinarily do not pull completely together since the size of the crystals to be tested might vary. To provide for the proper flow of the nitrogen between the blocks, even though they are not pulled together snugly, sleeves 42 and 45 are positioned within the channels and between the blocks 10 and 11 to provide a continuous channel for the nitrogen to flow.

The exit ports 36 and 37 can lead directly into the atmosphere. At this point the nitrogen has changed completely into a gas and escapes into the air as a gas. It has been found that the amount of nitrogen added to the atmosphere of a room of any reasonable size has no appreciable effect upon the qualities of the atmosphere insofar as human safety is concerned.

Forming of the liquid nitrogen channels in the blocks can be accomplished simply by drilling holes therein. Some of the holes when formed extend through to the exterior of the blocks and must be plugged. Such plugging can be effected by inserting in the holes the standoff insulators 21, 22, 50, and 51. These standoff insulators thus perform a dual function of plugging undesirable holes in the block, as well as being standoff insulators for the terminals of the temperature sensing winding, such as winding 20 in block 11.

Figure 2:
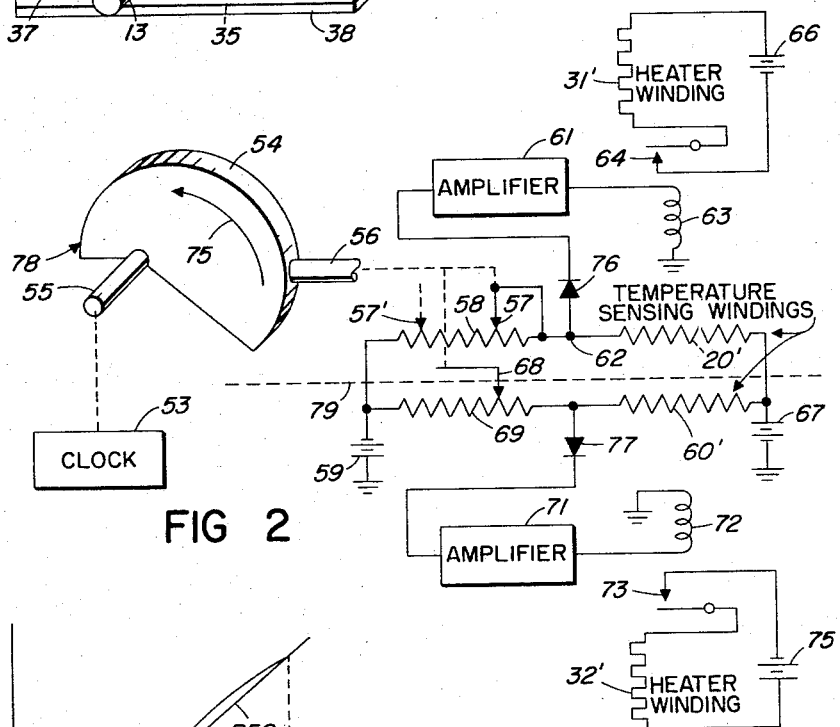
FIG. 2 is a combination schematic and block diagram of the basic elements of a control circuit for operating the oven in the manner described in this invention.

Referring now to FIG. 2, there is shown a combination block diagram and schematic diagram of the control circuit for the oven of FIG. 1. In FIG. 2 the timing of the temperature rise is controlled by a clock 53 which drives a cam 54 through appropriate shaft means 55. Cam means 54, which rotates in the direction of arrow 75, drives a shaft 56 which is connected mechanically to the movable contact 57 of the potentiometer 58, and also to the movable contact 68 of potentiometer 69.

It should be noted that all the circuitry above the dotted line 79 in FIG. 2 is employed for controlling the current to the heater winding 31' in block 11 in FIG. 1, and all the circuitry below the dotted line 79 is employed for controlling the current to the heater winding 32' in block 10 of FIG. 1.

More specifically, the potentiometer 58, the temperature sensing winding resistor 20' (the winding itself is designated by reference character 20 in FIG. 1), the diode 76, the amplifier 61, the relay winding 63, the relay contact 64, the heater winding 31', and the battery source 66 are all employed in the control of the heater winding 31'. Similarly, the potentiometer 69, the temperature sensing winding resistor 60', the diode 77, the amplifier 71, the relay including winding 72, contact 73, and a battery source 75 are all employed to control the current to the heater winding 32'. The battery sources 59 and 67, as well as the cam 54 and the clock 53, are common to both control systems.

The operation of the control system for the heater winding 31' will be described in detail and it will be understood that the operation of the control system for the heater winding 32' is identical and will not be described again.

In the operation of the circuit for controlling the current to heater winding 31' the potentiometer 58 and the temperature sensing resistor 20' act as a potential divider across the negative battery 59 and the positive battery 67 which can have voltages of equal but opposite polarity. Thus, when the resistance of potentiometer 58 and the sensing winding resistor 20' are equal, the potential at the tap 62 is zero or ground. Under such circumstances the relay winding 63 is de-energized so that contacts 64 are open and no current is supplied to heater winding 31'. Similarly, for reasons that will be described later, when the potential of the point 62 is negative with respect to ground the diode 76 will prevent energization of the relay 63, so that the heater winding will receive no current.

In the discussion of the operation of the circuit of FIG. 2, which follows, assume that the oven has been cooled to a −50° C. and that the clock is set to zero time so the point 78 of the cam 54 is adjacent the shaft 56. Under these circumstances, the slide contact 57 will be in its extreme left position, as shown by the dotted slide contact 57'; the portion of the resistor 58 to the left of the sliding contact 57 will be small, and the battery 59 connected to tap 62 through such small portion of resistor 58. The resistance of temperature sensing winding 20 is also very low at this low temperature and is, in fact, constructed to be substantially the same as the resistance of the potentiometer when the movable contact 57 is in its extreme left-hand position.

As the cam begins to turn the movable contact 57 will move to the right so that the resistance of the potentiometer will increase above that of the resistance 20' of the sensing winding 20. The potential of tap 62 will then become positive and the current will flow to amplifier 61 where it will be amplified to energize relay 63, close the contacts 64, and connect battery 66 to heater winding 31'.

Figure 3:
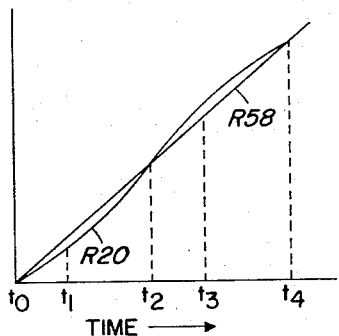
FIG. 3 shows the thermal operating characteristics of the circuit.

Reference is made to the curves of FIG. 3 which shows the increase of the resistance of the potentiometer 58 and the sensor winding resistance 20' with time. At time $t_1$ the value of the resistance 58 is shown as exceeding that of the sensor winding 20'. As discussed above, this will cause energization of the relay winding 63.

As the heater windings cause heating of the oven and the temperature sensing windings, the resistance of sensing winding 20' will begin to increase and will ultimately exceed that of the potentiometer 58. Such a crossover point is shown at time $t_2$ in FIG. 3. Following this time the potential of tap 62 will become negative with respect to ground so that no current will be supplied to amplifier 61; said current being blocked by diode 76. The relay winding 63 will then become deenergized and the contacts 64 will be opened. Thus, the heater winding 31' will be disconnected from its battery supply 66 and the oven will begin to cool.

Since the sensing winding is located some distance from the heater windings, the temperature immediately around the heater windings will be greater than that of the sensing windings at time $t_2$ when the relay 63 became de-energized. Consequently, for a short interval of time after $t_2$, the temperature of the sensing winding will continue to increase so that the resistance thereof will actually exceed that of the active portion of the potentiometer resistor. However, as the active resistance of potentiometer 58 continues to increase it will eventually again exceed that of the sensing winder 20. Assume such ocurrence takes place at time $t_4$. Then, at time $t_4$ the potential of tap 62 will again become positive to energize the relay winding 63 and supply the battery source 66 to heater winding 31'.

It has been found that in working models of the invention, the temperature differences between the temperature sensing winding and the desired temperature as determined by the setting of the potentiometer 58 can be maintained within one-quarter degree centigrade. It has further been established by tests that the temperature of the crystal can be maintained within a one-half degree centigrade of the temperature indicated by the resistance of the sensing winding.

It is to be understood that the form of the invention shown herein and described is but a preferred embodiment thereof and that various changes may be made in physical proportionsc and in materials without departing from the spirit or scope of the invention.

I claim:

1. Temperature controlled oven means for controlling temperature over a range of temperatures as a function of time and comprising:

first and second heat conducting elements constructed to fit together to form a partial enclosure with a cavity therein;

temperature sensing means for detecting temperature changes in said first and second heat conducting elements;

cooling means for cooling said first and second heat conducting elements to a predetermined low temperature level;

heating means for heating said first and second heat conducting elements;

and control means responsive to said temperature sensing means to control said heating means to cause the temperature of said first and second heat conducting elements to increase from said predetermined low temperature level over said range of temperatures to a predetermined higher temperature level in acordance with a predetermined function of time.

2. Temperature controlled oven means in accordance with claim 1 in which:

said temperature sensing means comprises first and second temperature sensing winds embedded within said first and second heat conducting elements, respectively;

and said cooling means comprises a network of channels formed in said first and second heat conducting elements and means for causing a refrigerant to flow through said channels.

3. Temperature controlled oven means in accordance with claim 2 in which:

said network of channels is formed to provide coincidence between channel openings when said first and second conducting elements are fitted together, and comprising sleeve means for connecting said coincident channel openings to enable flow of said refrigerant between said first and second heat conducting elements.

4. Temperature controlled oven means in accordance with claim 2 in which:

each of said heat conducting elements comprises a substantially toroidally shaped groove formed therein with a cylindrically shaped portion of said heat conductive elements constituting the center of said toroidally shaped groove;

in which said temperature sensing windings are wound around said cylindrical shaped portions;

and comprising a layer of epoxy type resin over said heating elements and within said toroidally shaped groove to embed said temperature sensing windings therein.

5. Temperature controlled oven means for controlling temperature over a range of temperatures as a function of time and comprising:

a first heat conducting element, a second heat conducting element, said first and second heat conducting elements each being constructed to fit together to provide a cavity substantially surrounded by said first and second heat conducting elements;

first and second temperature sensing means embedded in said first and second heat conducting elements, respectively;

first and second electrically energized heating elements for heating said first and second heat conducting elements, respectively;

cooling means comprising a network of channels within said first and second heat conducting elements, and means for circulating a refrigerant through said network of channels;

and control means for controlling the electrical current supplied to said first and second heating elements to control the temperature rise of said temperature sensing means over a given temperature range as a function of time.

6. Temperature controlled oven means in accordance with claim 5 in which:

said network of channels is formed to provide coincidence between channel openings when said first and second conducting elements are fitted together;

and comprising sleeve means for connecting said coincident channel openings to enable flow of said refrigerant between said first and second heat conducting elements.

7. Temperature controlled oven means in accordance with claim 6 in which:

each of said conducting elements comprises a substantially toroidally shaped groove formed therein with a cylindrically shaped portion of said heat conducting elements constituting the center of said toroidally shaped groove;

in which said temperature sensing windings are wound around said cylindrically shaped portions;

and comprising a layer of epoxy type cement over said heating elements and within said toroidally shaped groove to embed said temperature sensing windings therein.

References Cited by the Examiner

UNITED STATES PATENTS 2,549,569  8/1951  Bradley _____ 165—48
2,767,118  10/1956  Gaymont _____ 165—12

MEYER PERLIN, *Primary Exminer.*

CHARLES SUKALO, *Examiner.*